US010159264B2

(12) United States Patent
Troedsson et al.

(10) Patent No.: US 10,159,264 B2
(45) Date of Patent: Dec. 25, 2018

(54) TUNICATE EXTRACT FOR USE IN ANIMAL FEEDS

(71) Applicant: BERGEN TEKNOLOGIOVERFØRING AS, Bergen (NO)

(72) Inventors: Christofer Troedsson, Bergen (NO); Eric Thompson, Bergen (NO); Jean-Marie Bouquet, Bergen (NO); Thorolf Magnesen, Bergen (NO); Christoffer Schander, Bergen (NO); Jiebing Li, Bergen (NO)

(73) Assignee: BERGEN TEKNOLOGIOVERFORING AS, Bergen (NO)

( * ) Notice: Subject to any disclaimer, the term of this patent is extended or adjusted under 35 U.S.C. 154(b) by 1021 days.

(21) Appl. No.: 14/365,933

(22) PCT Filed: Dec. 17, 2012

(86) PCT No.: PCT/GB2012/053162
§ 371 (c)(1),
(2) Date: Jun. 16, 2014

(87) PCT Pub. No.: WO2013/088177
PCT Pub. Date: Jun. 20, 2013

(65) Prior Publication Data
US 2015/0079223 A1 Mar. 19, 2015

(30) Foreign Application Priority Data
Dec. 16, 2011 (GB) .................... 1121722.1

(51) Int. Cl.
*A23K 50/80* (2016.01)
*A23K 1/10* (2006.01)
*A23K 40/25* (2016.01)
*A23K 40/20* (2016.01)
*A23K 10/20* (2016.01)
*A23K 20/147* (2016.01)
*A23K 20/158* (2016.01)

(52) U.S. Cl.
CPC .............. *A23K 1/10* (2013.01); *A23K 10/20* (2016.05); *A23K 20/147* (2016.05); *A23K 20/158* (2016.05); *A23K 40/20* (2016.05); *A23K 40/25* (2016.05); *A23K 50/80* (2016.05); *Y02A 40/818* (2018.01)

(58) Field of Classification Search
CPC .... A23K 20/147; A23K 20/158; A23K 40/20; A23K 40/25; A23K 50/80; A23K 10/20
See application file for complete search history.

(56) References Cited

U.S. PATENT DOCUMENTS 5,525,315 A * 6/1996 Burke .................. B01J 45/00
210/688

FOREIGN PATENT DOCUMENTS

| EP | 0476875 A2 * | 3/1992 | ............ B01D 61/02 |
|---|---|---|---|
| EP | 1 875 811 | 1/2008 | |
| JP | 48012798 B * | 4/1973 | |
| JP | 57-58860 | 4/1982 | |
| JP | 2001-352912 | 12/2001 | |
| JP | 2004-115489 | 4/2004 | |
| JP | 2004-298161 | 10/2004 | |
| JP | 2008-179545 | 8/2008 | |
| KR | 10-861 943 | 10/2008 | |
| KR | 10-2009-0107601 | 10/2009 | |

OTHER PUBLICATIONS

Brittanica (2001) 2 pages, downloaded from www.brittanica.com/animal/tunicate (Year: 2002).*
Hassanzadeh M. Composition and Application Potentials of Scandinavian Tunicates, Oct. 20, 2011, 70 pages, downloaded from https://www.diva-portal.org/smash/get/diva2:565784/FULLTEXT01.pdf (Year: 2011).*
Aquamax, dated Aug. 2008, Issue No. 3, 4 pages. (Year: 2008).*
Shi Ya-nan et al., "Analysis of Nutritional Components in Ciona intestinalis", Journal of Anhui Agri Sic, 2011, No. 20, p. 12235-12236 and 12324 (complete English translation enclosed.).
International Preliminary Report on Patentability and Written Opinion from PCT with Issuance dated Jun. 17, 2014 in connection with International Application No. PCT/GB2012/053162; 6 pages.
Li Xia et al., "Styela clava, a resource with broad prospect for processing", Fishery Science and Technology, 2008, v. 1, pp. 3-7 with English Translation.
Communication Received from European Patent Office in related EP Application No. 12 806 643.8; dated May 22, 2017; 53 pages.
English Translation of KR 100 861 943 B1 (2008).
English Translation of JP 2008 179545 A (2008).
English Translation of JP 2004 298161 A (2004).
English Translation of JP 2004 115489 A (2004).
International Search Report for PCT/GB2012/063162 dated Feb. 14, 2013.
Written Opinion of the International Searching Authority dated Feb. 14, 2013.
Search Report for GB 1121722.1 dated Apr. 16, 2012.

* cited by examiner

Primary Examiner — C. Sayala
(74) Attorney, Agent, or Firm — Nixon & Vanderhye, P.C.

(57) ABSTRACT

Animal feeds and feed components are provided which comprise tunicate material. The tunicate material may be whole tunicate, e.g. washed and/or dried, or a tunicate extract. Preferred tunicate extracts include protein- and/or lipid-enhanced extracts. Also provided are uses of tunicates and tunicate extracts as, or in, animal feeds and methods for feeding animals, e.g. fish, comprising administering feeds containing tunicate material.

18 Claims, 4 Drawing Sheets

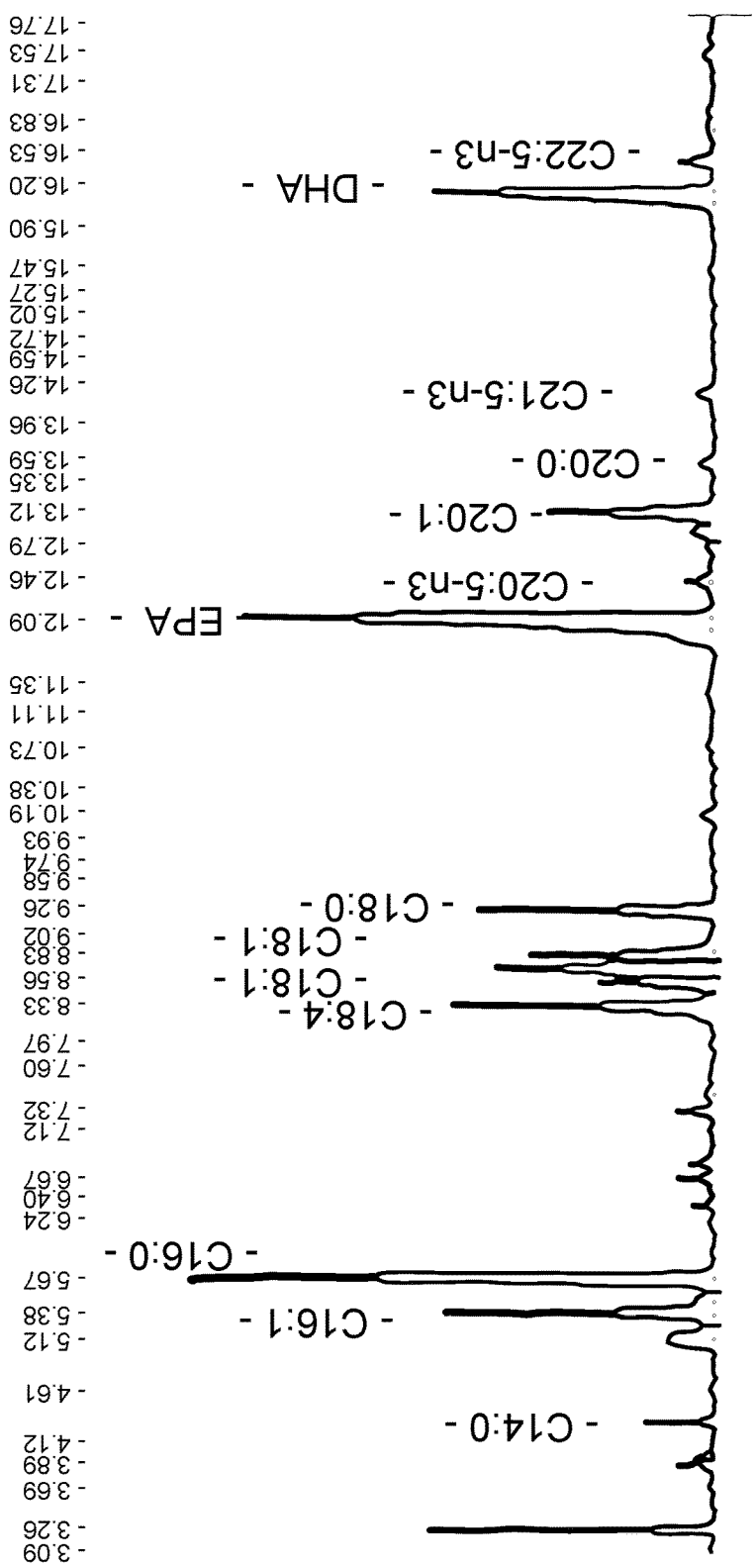

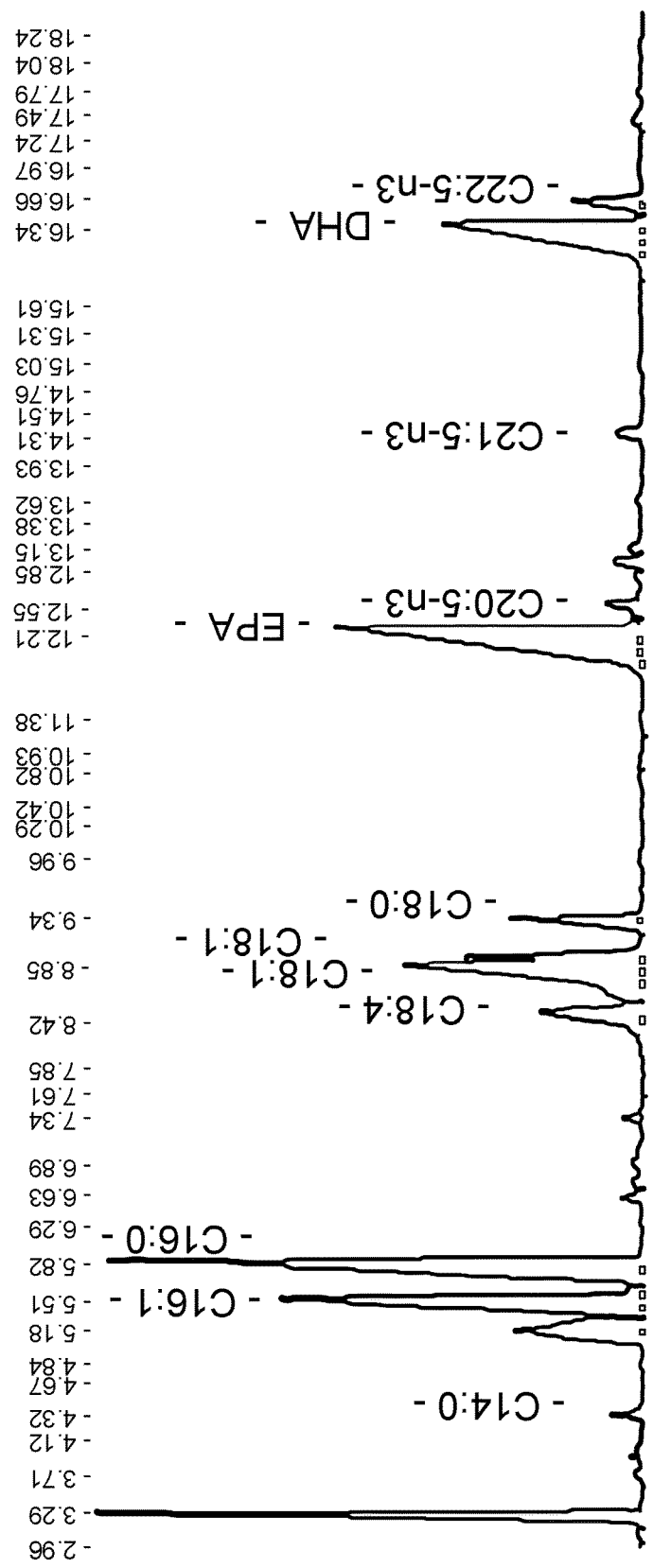

TUNICATE EXTRACT FOR USE IN ANIMAL FEEDS

This application is the U.S. national phase of International Application No. PCT/GB2012/053162 filed 17 Dec. 2012 which designated the U.S. and claims priority to GB 1121722.1 filed 16 Dec. 2011, the entire contents of each of which are hereby incorporated by reference.

This invention relates to an animal feed or feed component comprising one or more nutrient-providing extracts of a tunicate organism, especially of an ascidian. Preferred tunicate extracts include protein-rich and/or lipid-rich fractions including trace minerals and said extracts are especially suitable for use as replacements for conventional materials used in feeds, e.g. as a replacement for fishmeal in fish feeds. The invention further relates to the use of tunicate extracts as animal feeds, or as components thereof, as well as processes for preparing said feeds and methods of feeding animals with said tunicate extracts.

The farming of animals, especially carnivorous animals, requires a steady supply of food of sufficient nutritional quality to allow the animals to grow and develop appropriately. This is especially the case for farmed animals which are to be used as food for humans and other animals, for example the farming of livestock and fish. The source of nutritional components for use in animal feeds is a key factor in determining the cost, sustainability and ecological impact of producing the farmed animals.

Owing to the high global demand for meat and fish, the production of animal feed components is considered by some to be incompatible with the increasing global population because of the competition between using arable land for producing food for humans and producing food for animals. There is also predicted to be a significant shortfall in the supply of high quality nutritional material for farming fish in the future. Fishmeal has traditionally been the major protein source in feed for carnivorous fish but is directly linked with significant reductions in global fish stocks. Attempts to replace fishmeal with vegetable materials in feeds have been limited by introduction of associated, undesired flavours, lower meat quality and other effects. Replacement of fishmeal with soybean meal (a cheap source of protein) at high levels in feeds for farmed salmon results in severe morphological changes of the intestines and increased mortality in the salmon, as well as leading to overall changes in the fatty acid profile of the fillet which lowers its nutritional value for human consumption.

There is, therefore, an acute need for a high quality nutritional material which can be used in animal feeds and which can be produced in large quantities in an ecologically-sustainable manner without competing directly with the production of food for humans. The invention set forth herein meets this need.

The present inventors have discovered that tunicates (also called sea squirts) can be encouraged to grow at extremely high density in sub-sea "farms". For example, it is estimated that sub-sea farming of tunicates as described herein can provide at least 500-1000 tonnes of feed-quality protein material per hectare of ocean surface per year, which is considerably more than any of the major staple crops (per hectare of land surface) or animal protein sources. The farming of tunicates is not expected to impact detrimentally on the production of human foods or the environment. In addition, the present inventors have discovered that extracts or fractions of tunicates provide highly nutritious materials which can be used in animal feeds. Indeed, the protein-, mineral- and/or lipid-containing extracts and fractions of these tunicates may be used as a direct replacement for conventional high quality feed components such as fishmeal in animal feeds.

The tunicates are a group of marine eukaryotic organisms which are found throughout the world's oceans. They are distinguished from other animals by their ability to synthesize cellulose and they use this to build extracellular structures within which they live and filter-feed. Historically, the tunicates have been divided into four classes; Ascidiacea (the "ascidians"), Thaliacea, Appendicularia and Sorberacea. The ascidian species *Ciona intestinalis* is a well known model organism used in research into tunicate development and genetics.

Most tunicates feed by filtering sea water and many have a sedentary adult form following a mobile larval stage. Although some tunicates, e.g. certain Appendicularia, are known to be eaten by aquatic organisms such as larval and adult fish, very few tunicate species are deliberately harvested. A few ascidians in the sub-order pleurogona (e.g. *Pyura chiliensis*) are caught and eaten by humans; these are generally eaten raw, e.g. as sashimi, or are cooked in stews. Tunicates are also known to produce pharmaceutically-active compounds, some of which have been investigated for use in human medicine. However, tunicates, for example ascidians of the sub-order enterogona, have not been proposed as a source of food for animals such as domesticated animals and fish.

Use of tunicates to prepare feeds and feed components has the advantages that large quantities may be obtained (e.g. using the farming methods described herein) and that production of the organisms is not in competition with the production of other animal or human foods. Furthermore, because of the filter-feeding nature of the organisms, tunicate farming is expected to have remediation (e.g. cleaning) potential in coastal or inland waters, especially of eutrophic waters. The present invention therefore satisfies a long-felt need for high-quality nutritional feed components that can be obtained in an ecologically-sustainable manner.

The present invention is based, in part, on the findings that tunicates, especially ascidians of the sub-order enterogona (e.g. *Ciona intestinalis*), may be farmed at very high densities, and that material extracted from these tunicates has a remarkably high nutritional content, making it especially suitable for use as a feed or feed component for animals.

The first aspect of the invention provides the use of a tunicate or tunicate extract in the production of an animal feed or feed component. In a related aspect the invention provides an animal feed or feed component comprising (e.g. consisting essentially of) a tunicate or tunicate extract. Also provided is the use of a tunicate or tunicate extract in (or as) an animal feed. In an especially preferred embodiment, the feed or feed component is for a non-human animal.

As used herein, the terms "feed", "animal feed", "fish feed" and the like, will generally be understood to be a complete animal food, i.e. one which comprises all the necessary components of the diet. The term "feed component" will generally be understood to mean a nutrition-providing part of a complete food which is lacking at least one component necessary to provide all of the essential components of the animal diet. The term "a tunicate" used herein in relation to animal feeds and feed components refers to a material which comprises essentially all of the tunicate (or tunicates) as harvested. Such material may have a reduced water content relative to the harvested tunicates, i.e. it may be dried, but other components therein will typically not be further refined, purified or separated. The term "tunicate extract" is used to refer to a nutritionallyenhanced fraction of the harvested tunicate material. Such extracts may be dried and typically lack particular components of the harvested material, e.g. cellulose, proteins, nucleic acids, ash or lipids. Preferred tunicate extracts are those which comprise the nutritionally-rich fractions of the harvested material (e.g. proteins, lipids and/or trace elements) but which lack the nutritionally-poor fractions (e.g. ash, typically mostly sea salt). The term "tunicate material" is used generally to describe complete tunicates (e.g. as harvested) or fractions or extracts thereof.

The tunicate may be any tunicate of the classes Ascidiacea, Thaliacea, Appendicularia and/or Sorberacea. Preferably, the tunicate is an ascidian (i.e. a tunicate of the order Ascidiacea), especially preferably an ascidian of the sub-order enterogona, e.g. of the genus *Ciona, Ascidia* or *Ascidiella*. Preferred ascidian species according to the invention include *Ciona edwardsi, Ciona fascicularis, Ciona gelatinosa, Ciona imperfecta, Ciona intestinalis, Ciona moths, Ciona savignyi, Ascidia mentula, Ascidia virginea* and *Ascidiella aspersa*. Other preferred ascidian species according to the invention include those of the sub-order Aplousobranchia, preferably within the family Clavelinidae, e.g. *Clavelina lepadiformis* and *Polyclinum aurantium*, as well as those of the sub-order Phlebobranchia, e.g. *Corella parallelogramm*. In one preferred embodiment the ascidian is *Ciona intestinalis*. In one embodiment of the invention, the tunicate is not an ascidian of the sub-order pleurogona, especially not of the genus *Halocynthia, Styela, Microcosmus* and/or *Pyura*. Specifically, the ascidian is preferably not one or more ascidians selected from *Halocynthia roretzi, Styela clava, Microcosmus sabatieri, Pyura chilensis* and *Pyura stolonifera*; this is especially the case where the feed or feed component is intended for human consumption. It is particularly preferred that the tunicate is not an ascidian of the genus *Halocynthia*, especially not one or more of the species selected from *H. roretzi, H. aurantium, H. papillosa, H. pyriformis* and *H. spinosa*.

In one embodiment, the tunicate is a cellulose-containing tunicate. In an alternative embodiment, the tunicate is substantially cellulose-free, e.g. containing less than 1% by dry weight cellulose, especially containing less than 0.1% by dry weight cellulose.

The inventors have observed that farming tunicates by the methods described herein can lead to a high proportion of the tunicate material harvested being obtained or derived from a single species. This unexpected finding has the advantage that the resulting tunicate material will be highly homogeneous and reproducible from one harvest to the next. For example, the profile of tunicate species grown on sub-surface structures as defined herein may display a depth gradient, i.e. different species may dominate at different depths. Analysis of the tunicates harvested from different parts of the structure, e.g. different depths, allows for a more homogeneous and reproducible material to be obtained. In this embodiment, the tunicate material may be grown at a depth of between 1 and 80 meters below the surface, especially between 2 and 50 meters, more preferably between 5 and 20 meters below the surface.

Thus, in one embodiment the invention provides an animal feed or feed component as defined herein comprising (e.g. consisting essentially of) a material derived substantially from a single species of tunicate. Preferably, the material is obtained substantially from a single ascidian species as defined above, e.g. *Ciona intestinalis, Clavelina lepadiformis, Ascidia mentula, Ascidia virginea, Ascidiella aspersa, Corella parallelogramm* or *Polyclinum aurantium*. In an alternative embodiment, the tunicate material is derived substantially from two or more species of tunicate, e.g. from 3, 4, 5, 6 or more species. By "derived substantially from" is meant that at least 50% of the tunicate extract in the feed or feed component is derived from said species, e.g. from a single species. Preferably at least 75%, at least 85%, at least 90%, at least 95% or at least 99%, e.g. approximately 100%, of the tunicate or tunicate extract in the feed or feed component is derived from said species.

The recipient animals to which the feeds of the invention are to be fed include terrestrial and aquatic animals. The animal may be a human or a non-human animal, but is preferably a non-human animal (e.g. a mammal, a bird or a reptile). Preferably the animal is a domesticated livestock species (e.g. a pig, cow, horse, sheep, chicken, turkey, etc.), particularly a ruminant animal; a companion animal (such as a cat, dog, guinea pig, lizard, etc.); or a laboratory animal (e.g. a mouse, rat, rabbit, etc.). In one embodiment, the animal is not a rat.

In another embodiment the animal is a fish or shellfish. Preferred fish and shellfish include those species which are themselves farmed and/or harvested for human or animal feeds. Examples of fish to which feeds of the invention may be fed include carnivorous fish, especially Atlantic salmon (*Salmo salar*), chinook salmon (*Oncorhynchus tshawytscha*) and Coho salmon (*Oncorhynchus kisutch*); and rainbow trout (*Oncorhynchus mykiss*). The invention is also applicable to feed for bream, e.g. gilthead bream (*Sparus aurata*) and sea bream; carp, e.g. common carp (*Cyprinus carpio*); cod, e.g. Atlantic cod (*Gadus morhua*); halibut, e.g. Atlantic halibut (*Hippoglossus hippoglossus*); turbot, e.g. European turbot (*Psetta maxima*); sea bass (e.g. Mediterranean sea bass and Asian sea bass); and tilapia, e.g. of the genus *Oreochromis*. Examples of shellfish to which feeds of the invention may be fed include molluscs (e.g. mussels, oysters, clams, cockles, scallops, etc.); crustaceans (e.g. shrimps, prawns, crayfish, crabs, lobsters, etc.); and echinoderms (e.g. sea urchins, sea cucumbers, etc.). Especially preferred shellfish include shrimps, crayfish and prawns.

Based on the information provided herein regarding the nutritional qualities of tunicate extracts, see e.g. Examples 3 and 4, the skilled person would be able to formulate tunicate extracts into feeds suitable for a wide range of different animals. By way of example, fish feeds are particularly discussed below.

In one embodiment, the invention provides an animal feed in which some or all of the protein and/or lipid component of a conventional feed are replaced by a tunicate or tunicate extract as described herein. Preferably, the tunicate extract is a protein- and/or lipid-containing tunicate extract and replaces between 10% and 100% by weight of the protein- and/or lipid-containing components of the conventional feed, especially between 25% and 75%, between 35% and 60%, or about 50% of the protein- and/or lipid-containing components of the conventional feed. Preferably, the animal feeds of the invention have a protein and/or lipid component comprising at least 10%, at least 25%, at least 40%, at least 60%, at least 80% or at least 90%, e.g. about 100%, protein and/or lipid derived from a tunicate.

The animal feeds and feed components of the invention preferably comprise at least 0.2% by weight of tunicate protein, especially at least 2%, 5%, 10%, 20%, 30%, 40%, 50% or 60% by weight of tunicate protein. Preferably, the animal feeds and feed components of the invention comprise less than 80% by weight, especially less than 75%, 70%, 65% or 60% by weight of tunicate protein. In addition, or alternatively, the animal feeds and feed components of the invention preferably comprise at least 0.03% by weight of tunicate lipids, especially at least 0.1%, 0.5%, 1%, 5%, 10%, 15%, 20%, 25%, 30% or 35% by weight of tunicate lipids. Preferably, the animal feeds and feed components of the invention comprise less than 50% by weight, especially less than 40%, 35%, 30% or 25% by weight of tunicate lipids. As would be appreciated by the skilled person, complete feeds comprising tunicate material will often comprise several other components and will therefore typically have amounts of tunicate-derived proteins and/or lipids towards the lower end of the ranges defined herein.

In one preferred embodiment, the animal feeds of the invention are intended for feeding to animals which can digest cellulose or which can accommodate some cellulose in their diets. Including cellulose in the animal feeds may be beneficial to the formulation and/or delivery of the animal feed. Such feeds preferably comprise between 0.04% and 20% by weight of tunicate cellulose, especially between 0.05% and 15% of tunicate cellulose, e.g. between 1% and 5% or between 5% and 10% by weight of tunicate cellulose. In an alternative embodiment, the animal feeds of the invention are intended for feeding to animals which cannot accommodate cellulose in their diet. Such feeds preferably comprise less than 5% by weight tunicate cellulose, especially less than 2%, 1%, 0.5% or 0.1% by weight of tunicate cellulose.

A typical fish feed, e.g. for Atlantic salmon, may for example include (by weight): about 45% of fishmeal; about 25% of fish oil; about 5% of plant oils; about 20% soyaprotein meal; about 10% wheat gluten; about 4% starch; and about 1% of other components (e.g. minerals, vitamins, colouring agents etc.). Some or all of the protein components (e.g. the fishmeal and plant ingredients), the lipid components (e.g. the fish oil and plant oil) and/or the other components (e.g. the minerals) may be replaced by tunicate material as described herein.

In a further preferred embodiment the invention provides a fish feed or fish feed component derived from a tunicate as herein described, e.g. a fish feed or feed component comprising (or consisting essentially of) tunicate material, preferably the tunicate material is derived substantially from a single species of said tunicate.

A fish feed, e.g. a salmon feed, according to the present invention may include (by weight): 0-50% fishmeal, preferably 5-40%, e.g. around 30%, fishmeal; 0-40% fish oil, preferably 5-30%, e.g. around 25%, fish oil; 0-20% soyaprotein meal, preferably 5-15%, e.g. around 10%, soyaprotein meal; 0-20% wheat gluten meal, preferably 5-15%, e.g. around 10%, wheat gluten; 1-80% tunicate material as herein defined, preferably 2-60%, 5-40% or 10-25%, e.g. around 15%, tunicate material; 0-10% plant oil, e.g. around 5% plant oil; 0-5% starch, e.g. around 4% starch; and optionally around 1% Vitamin/mineral mix.

Animal feed components according to the invention are nutrition-providing products derived from tunicate material, preferably the feed components comprise (e.g. consist essentially of) a tunicate extract. Tunicate extracts may be prepared using a number of techniques adapted to provide different amounts of nutritional product. The intended composition and properties of the desired feed component will affect the nature of its preparation. Example 2 sets out methods for obtaining water-reduced, ash-reduced, protein-enriched and lipid-enriched fractions of tunicate material. All of these fractions can be used as tunicate extracts in the exercise of the present invention, either individually or in combination.

Thus, in one embodiment, the invention provides an animal feed which comprises (e.g. consists essentially of) a tunicate extract as herein defined, especially a water-reduced, ash-reduced, cellulose-reduced, protein-enriched and/or lipid-enriched extract of a tunicate. The animal feeds of the invention preferably comprise between 1 and 100% by weight of tunicate or tunicate extract as defined herein. Typically the tunicate or tunicate extract will be added to the feed at a level of between 2 and 50% by weight, especially between 5 and 20% by weight.

Tunicates, e.g. ascidians such as *C. intestinalis*, usually comprise an outer part, the tunic or mantle, and an inner part, the body. The tunic typically contains cellulose, along with skin proteins (e.g. collagen) and coloured compounds such as carotenoids, whereas the body contains the internal organs. As shown in Example 3, the mantle is poorer in nutritional components such as proteins than the body.

The animal feeds and feed components of the invention preferably comprise (e.g. consist essentially of) the inner part of the tunicate (i.e. the body) or an extract thereof. In one embodiment the animal feeds and feed components of the invention comprise (e.g. consist essentially of) the whole tunicate (i.e. the mantle and the body) or an extract thereof. However, the animal feeds and feed components of the invention preferably do not comprise the tunic or any extract thereof. According to this embodiment, the tunicate material and extracts defined herein do not contain as a major part a pigment, a carotenoid and/or collagen. Preferably, the tunicate material or tunicate extract is substantially free from pigments, carotenoids and/or collagens. Examples of carotenoids which may be reduced in, or absent from, the tunicate material or tunicate extract include carotenoid alcohols (e.g. xanthophylls, especially alloxanthin and/or diatoxanthin), and carotenoid ketones (e.g. astaxanthin). By "do not contain as a major part" is meant either that the tunicate substantially lacks said components, or that the tunicate extract has a reduced level of said components relative to the whole tunicate material. For example, where the tunic of the tunicate contains carotenoids (as is the case e.g. for *H. roretzi*) a tunicate extract substantially free from carotenoids could be an extract of the whole tunicate which is enriched in a non carotenoid-containing fraction, or it could be the inner body parts or an extract thereof.

Thus, an animal feed or feed component as defined herein is preferably one which comprises (e.g. consists essentially of) the inner body parts of the tunicate, or a nutrition-providing extract thereof.

The invention further provides an animal feed comprising (e.g. consisting essentially of) a tunicate extract as herein defined in admixture with one or more conventional feed ingredients, e.g. fishmeal, fish oil, soyaprotein meal, wheat gluten, starch etc. The levels of the one or more conventional feed ingredients are preferably as herein defined. In one embodiment, the animal feed comprises no starch. In another embodiment, the starch in the animal feed is not rice starch.

The growth and harvesting of tunicates for use in the present invention may be carried out in a number of ways. Tunicate growth on natural sub-surface ocean structures which are seeded naturally or artificially may be employed. Alternatively, tunicates may be harvested directly from ocean water using techniques known in the art (e.g. trawling and raking the seafloor or other horizontal and/or vertical sub-sea surfaces). However, it is especially preferred that tunicates for use in the invention are grown on dedicated sub-surface structures which are seeded naturally from natural populations or from laboratory cultures. Methods for farming tunicates using such structures are described in international patent publication No. WO2011/158215, the contents of which are incorporated herein by reference.

Example 1 (below) describes a method suitable for the growth and harvesting of tunicates, e.g. *C. intestinalis*, using a 3-dimensional sub-surface structure. Briefly, the structure comprises a plurality of vertical members (e.g. ropes) secured at the surface by buoys, each member having a plurality of horizontal plates attached at between 6 and 20 meters depth. The plates have an area of approximately 0.17 m$^2$ and are equally spaced at around 3 plates per vertical meter on the vertical member. Each vertical member is placed between 1 and 1.5 meters from neighbouring members and the whole structure typically occupies approximately one hectare (10,000 m$^2$) of ocean surface, e.g. the structure consists of approximately 10,000 vertical members. The colonisation surfaces of the structure, especially the plates, are typically made of plastics material, e.g. PVC, and are dark in colour, e.g. black or grey. Placement of the structure in the ocean encourages tunicate seeding and attachment and the structure is typically left in the sea for sufficient time for the tunicates to mature and grow to a size suitable for harvesting, e.g. between about 10 g and 100 g, especially around 30 g. The structures can be left in the sea for between 1 and 48 months, preferably between 4 and 12 months, especially for about 6 months to allow the tunicates to grow to the appropriate size.

Harvesting tunicates farmed by the above method generally involves lifting the ropes and detaching the organisms from the colonising surfaces of the structure, e.g. by hand or by vacuuming the surfaces. The tunicates may be removed from the structures above water or underwater. Typically, the organisms harvested from structures farmed according to Example 1 yield more than 90% by weight of *C. intestinalis*, *Ascidia* sp. and/or *Clavellina*. Tunicate material (dry mass) of around 2-45 kg/m$^2$ of colonising surface is obtainable annually using the methods described herein, i.e. around 15-350 kg of tunicate material (dry weight) is obtainable per member of the sub-surface structure, or around 150-3500 tonnes of tunicate material per hectare of ocean surface. This yield may be increased significantly by deploying structures to a depth of more than 20 meters below the surface.

Once the tunicate material has been detached, it can be processed to provide one of the extracts or fractions defined herein, e.g. as described in Example 2. The tunicate material will typically first be dried to provide a water-reduced tunicate material. The drying may be performed on the whole tunicate material or on a part of the material. For example, the tunic and other body parts of the tunicate may be separated (e.g. mechanically by cutting, squeezing and/or centrifugation). Drying may be performed by processes known in the art, for example by one or more of pressing, heating, freeze-drying and reduced pressure processes. Preferably, the heating is carried out at a temperature of less than 100° C., especially less than 80° C., 70° C. or 60° C. to maintain the nutritional components of the material, e.g. proteins and/or lipids, in a substantially native form. Drying of the tunicate material is preferably carried out to a dryness content (also referred to herein as "dryness") of at least 35%, especially at least 50%, at least 70%, at least 80% or at least 90%. Typically, pressing and/or heating can dry the tunicate material to a dryness of between 40% and 90%, e.g. about 89%. The dryness content is calculated using standard techniques and is the weight percent of fully dried solids (at constant weight after prolonged heating) based on the wet weight of the material. After drying, the material may be ground, e.g. using a mill, in a conventional way.

The tunicate material can also be processed to reduce the ash content of the material. Ash is the inorganic residue left after dry oxidation at 550-600° C. (e.g. complete burning in air at 575° C.) and can be measured using standard procedures (e.g. as described in international standard ISO 5984: 2002—Animal feeding stuffs—Determination of crude ash). The ash content of tunicate materials predominantly comprises the inorganic salts from sea water. These components can be removed from the tunicate material by processes known in the art, for example washing, optionally followed by fractionation, filtration and/or centrifugation. The washing can be performed at any stage during the processing, especially prior to a final drying step. The tunicate material can also be processed to reduce or remove cellulose and other polysaccharides by methods known in the art, for example by treatment of dried tunicate material with degradative enzymes such as cellulase (designated EC 3.2.1.4). Pre-treatment of the material to alter the tunicate morphologic structures may be performed to assist in the enzymatic degradation. Alternatively, the polysaccharide removal step can be performed at an early stage by mechanical separation of the tunic from the other parts of the organism in species where the tunic contains the majority of the polysaccharide (e.g. cellulose) in the organism. It is also possible to reduce the cellulose content by applying a solvent such as $CS_2$ or thiourea/NaOH/urea. Pre-treatment of the material to alter the tunicate morphologic structures may be performed to assist the dissolution of cellulose in the solvent.

Ash-reduced and/or polysaccharide-reduced (e.g. cellulose-reduced) tunicate extracts will be more palatable to certain animal species, e.g. certain fish, than the raw or dried materials. Preferably the content of ash in the feed or feed component of the invention is less than 45%, especially less than 30%, 15%, 10%, 5% or 1% by dry weight. Preferably the content of polysaccharide (e.g. cellulose) in the feed or feed component of the invention is less than 20%, especially less than 15%, 10%, 5%, 2%, 1% or 0.1% by dry weight.

Alternatively, it may be preferable to have a level of cellulose in the feed, for example where the recipient animal tolerates or even requires it and/or where the consistency of the feed (e.g. in pellet form) is enhanced by the presence of the cellulose. For example, in salmon feed there is no nutritional need for cellulose, but cellulose or other carbohydrates may be included for technical reasons to improved pellet quality or as a filler in vitamin and mineral mix. Similarly, ruminants may require some degree of cellulose in their diet and so tunicates or tunicate extracts which contain cellulose may be beneficial for use in these animals. In this embodiment, the invention provides a feed or feed component comprising between 0.04% and 20% by dry weight of tunicate cellulose, preferably between 0.05% and 10% and especially between 1% and 5% by dry weight of tunicate cellulose (e.g. on an ash-free basis).

Other components which can be reduced in or removed from the tunicate material include heavy metals (e.g. by centrifugation of a suspension of tunicate material to separate out metal-containing blood cells or by chelating the metals) and other toxins (e.g. by biological capture using immobilised binding molecules such as antibodies). Preferably the content of heavy metals and/or toxins in the feed or feed component of the invention is less than 50%, especially less than 25%, 10%, 5%, 1% or 0.1% of the content of an equivalent feed or feed component comprising essentially the same level of tunicate material that has not been treated to remove the said heavy metals and/or toxins. In a particularly preferred embodiment, the tunicate is a non-toxic tunicate. The term "non-toxic" is intended to mean that the dry mass of the tunicate organism produces substantially no toxic effects when fed to a recipient animal at standard levels of incorporation in its feed, e.g. at levels of between 5% and 75% by weight of the animal feed. In another preferred embodiment, the tunicate extract is non-toxic when incorporated in the animal feed, i.e. the material used in the feed or feed component does not contain a significant amount of the toxic substance or substances. For example, any specific toxins in the tunicate material may be removed during processing of the extract and/or prior to incorporation into the animal feed or feed component.

According to this embodiment, the invention provides animal feeds or feed components as defined herein wherein the tunicate extract is a partially or fully dried, ash-reduced, polysaccharide-reduced (e.g. cellulose-reduced), heavy metal-reduced, and/or toxin-reduced extract. Preferably, the tunicate extract is a dried and ash-reduced extract either of the tunicate inner parts or of the whole tunicate.

In a related embodiment, the invention provides a process for preparing a partially or fully dried, ash-reduced, polysaccharide-reduced (e.g. cellulose-reduced), heavy metal-reduced, and/or toxin-reduced animal feed or feed component, said process comprising treating a tunicate material to reduce the levels of water, ash, polysaccharide (e.g. cellulose), heavy metal and/or toxins in said material and optionally formulating the said material into an orally administrable form.

The heavy metal content of the tunicate or tunicate extract may need to be modified to render the material suitable for use as a feed or feed component for some animals. Levels of heavy metals may be reduced by processes known in the art and as defined herein. In the case of *C. intestinalis*, the levels of many of the potentially toxic elements are within the levels allowed for fish meat as regulated by the European Union (see the Commission of the European Communities, (EC) No. 1881/2006, "Setting maximum levels for certain contaminants in foodstuffs") and by China (see Chinese national standard, GB 2762-2005, "Maximum levels of contaminants in foods"). Levels of heavy metals in dried *C. intestinalis* are generally similar to those found in other aquatic animals.

Fish feeds according to the present invention therefore preferably comprise levels of heavy metals, especially tunicate-derived heavy metals, within the limits regulated by EC No. 1881/2006 and/or by GB 2762-2005. Preferred fish feeds comprise levels of aluminium of less than 200 ppm (parts per million), especially less than 100 ppm; levels of chromium of less than 4 ppm, especially less than 2 ppm; levels of arsenic of less than 1 ppm, especially less than 0.5 ppm; levels of selenium of less than 2 ppm, especially less than 1 ppm; levels of cadmium of less than 0.1 ppm, especially less than 0.05 ppm; and levels of lead of less than 0.5 ppm, especially less than 0.3 ppm. The acceptable level of heavy metals in feed components for use in the present invention will depend on a number of factors, especially the intended level of incorporation of the component in the final feed and on the recipient animal. However, levels of heavy metals, especially tunicate-derived heavy metals, in said feed components are preferably no more than 5 times the levels stated above, especially no more than 4, 3, 2.5, 2 or 1.5 times the levels stated above.

Despite being toxic when fed in large quantities, certain heavy metals are essential trace elements in the diet of many animals. Thus, the feed or feed component of the invention preferably includes levels of trace elements such as but not limited to Se, Cu, Zn, Mn, Mo, Mg, Sr, Cr and V. The animal feed of the invention preferably comprises one or more of the following tunicate derived trace elements: selenium at 0.05 to 6 ppm, e.g. 0.1 to 2 ppm; copper at 1 to 50 ppm, e.g. 2 to 20 ppm; zinc at 5 to 200 ppm, e.g. 20 to 100 ppm; manganese at 0.5 to 50 ppm, e.g. 2 to 10 ppm; molybdenum at 0.01 to 0.5 ppm, e.g. 0.05 to 0.5 ppm; magnesium at 5 to 200 ppm; e.g. 10 to 50 ppm; strontium at 0.05 to 5 ppm, e.g. 0.1 to 1 ppm; chromium at 0.05 to 5 ppm, e.g. 0.1 to 1 ppm; and vanadium at 0.05 to 10 ppm, e.g. 0.1 to 1 ppm.

As an alternative, or in addition, to the processing steps described above specific components of the tunicate material can be selectively purified, e.g. the relative levels enhanced, to provide tunicate extracts with more desirable nutritional properties. In particular, the protein and lipid fractions of the tunicate material may be selectively purified or enriched to provide nutrition-enhanced extracts.

Typically, a protein extract of the tunicate material can be prepared by treatment of a dried and preferable cellulose-reduced material by standard processes such as protein isolation with or without proteinase pre-treatment followed by salt precipitation, centrifugation, re-suspension and/or further separation techniques, e.g. chromatography. For example, the inventors have discovered that a protein enriched fraction derived from the internal organs of tunicates may be insoluble in water and that this fraction may conveniently be used as a tunicate protein extract without further treatment. Tunicate protein extracts preferably contain at least 45 or 50% by weight of tunicate protein, especially at least 60%, at least 75%, at least 85%, at least 90% or at least 95% by weight protein. Preferred protein extracts contain between 55% and 95% by weight protein, e.g. between 65% and 80% by weight protein. In one embodiment the tunicate or tunicate extract has between 40 and 60% by weight of protein (calculated on an ash-free basis).

Tunicate lipid extracts may be obtained using methodology known in the art. For example, treatment of the dried and optionally cellulose-reduced material with solvents, followed by separation (e.g. centrifugation) and evaporation yields a lipid-enriched fraction. The conditions can be chosen to favour the extraction of polar or non-polar lipids and may be determined by the skilled person by routine optimisation of known methods. Extraction with supercritical fluid (e.g. carbon dioxide) is another method that may be used to separate lipids from a tunicate material in which extraction with and without a retainer (e.g. ethanol) may be employed to separate polar and non-polar lipids. Cooking of wet tunicates in boiling aqueous solvent, e.g. around 100° C., can also extract lipids from a tunicate sample. Owing to the density of the lipids, these will float at the liquid surface and may easily be separated from the aqueous fraction to provide a lipid extract.

Lipid-containing extracts preferably contain at least 30% by weight of tunicate lipid, especially at least 50%, at least 70%, at least 80%, at least 90% or at least 95% by weight lipid. Preferred lipid extracts contain between 40% and 90% by weight lipid, e.g. between 55% and 75% by weight lipid. In one embodiment the tunicate or tunicate extract has between 1 and 10% by weight of lipid (calculated on an ash-free basis), especially between 1.5 and 8%, e.g. between 2 and 6% by weight. The lipid part of the extract preferably comprises omega-3 fatty acids in an amount of between 5% and 50% by weight, preferably between 10% and 40% or 25% and 35% by weight. Preferably at least 20% of the lipid extract by weight, e.g. at least 25%, 30%, 35% or 40%, consists of polyunsaturated fatty acids. The lipid part of the extracts preferably comprises omega-6 fatty acids in an amount of between 1% and 10% by weight, preferably between 2% and 8%, e.g. around 5%, by weight. The total amount of omega-3 and omega-6 fatty acids in the lipid part of the extracts is preferably less than 50%, especially less than 35%, by weight. The lipid part of the extracts preferably comprises eicosapentaenoic acid (EPA, ω-3 20:5) in an amount of at least 10% by weight, especially at least about 15% or 20% by weight. The content of EPA is preferably in the range of 12 to 40% by weight, e.g. between 16 and 32% by weight, especially around 24%. The lipid part of the extracts preferably comprises docosahexaenoic acid (DHA, ω-3 22:6) in an amount of less than 15% by weight, especially less than 10% or 5%, e.g. in the range of 1 to 4% by weight, e.g. about 3%.

The tunicate lipid extracts defined herein are especially suitable for use in feed compositions for fish and crustaceans because a feeding regime including these tunicate lipids can fulfil the nutritional requirements of these animals.

Accordingly, the invention provides an animal feed or feed component comprising a tunicate extract, wherein said tunicate extract is a protein-enhanced and/or lipid-enhanced tunicate extract as defined herein, especially an extract comprising at least 50% by weight tunicate protein and/or at least 30% by weight tunicate lipid. In another embodiment, the invention provides an animal feed or feed component comprising a protein-enhanced and/or lipid-enhanced tunicate extract comprising at least 40% by weight tunicate protein and/or at least 1, 1.5 or 2% by weight tunicate lipid, especially containing at least 50 or 60% by weight tunicate protein and/or at least 4 or 6% by weight tunicate lipid.

The feed or feed component of the present invention may comprise one or more of the extracts and fractions as defined herein. According to this embodiment, the invention provides an animal feed or feed component comprising (e.g. consisting essentially of) a protein-containing and/or lipid-containing extract of a tunicate as defined herein. In a further embodiment, the invention provides a feed or feed component in which conventional protein- and/or lipid-providing ingredients are partially or totally replaced with a protein and/or lipid extract of tunicate material as defined herein. In one embodiment the animal feed does not comprise casein. Preferred feeds and feed components are fish feeds and feed components in which some or all (e.g. substantially all) of the fishmeal and/or plant protein content is replaced by a protein-enriched tunicate extract as defined herein, and/or wherein some or all (e.g. substantially all) of the fish oil and/or plant oil content is replaced by a lipid-enriched tunicate extract as defined herein.

Typically, the animal feeds described herein will be fed to animals (e.g. fish) in conventional foodstuff forms. Methods for mixing feed components and providing feeds (e.g. fish feeds in extruded or pellet form) are well known in the art. Preferred forms for feeds of the invention, especially fish feeds, include dry pelleted, expanded and extruded forms and also include moist and semi-moist forms. Alternatively, the tunicate extract may be fed to the animal separately from the conventional feed as a supplement to the diet. Feeds and feed components of the invention may also be provided in a powder or flour form, which may be of a coarseness suitable for the intended application.

In this embodiment, the invention provides a method of feeding an animal (e.g. a non-human animal) comprising administering to said animal a nutrition-providing tunicate or tunicate extract, e.g. in or as a feed as herein defined.

The method typically involves providing the animal with an oral feed for ingestion. The present invention further provides a nutrition-providing feed or feed component as herein defined for use in feeding an animal, e.g. for use in a method of feeding an animal as defined above.

A process for preparing a feed or feed component according to the invention will generally include the admixture of tunicate material, e.g. one or more tunicate extracts as defined herein, with one or more conventional animal feed ingredients. This mixture may then be processed further. Suitable conventional ingredients and methods for preparing feeds and feed components are well known in the art and examples are described above. In one embodiment the conventional feed ingredients do not include starch-based ingredients, e.g. rice. The size and form of the feed will depend on the type of animal to which the feed is to be administered and may readily be determined by the skilled person.

Thus, viewed from a further aspect, the invention provides a process for preparing an animal feed or feed component as defined herein. In one embodiment, the process comprises a step of extruding, pelleting, rendering or otherwise preparing an orally-administrable composition comprising a tunicate material as defined herein. In a preferred embodiment, the process comprises a step of admixing said tunicate and/or tunicate extract with one or more conventional feed ingredients, e.g. starch, sugar, plant protein, plant oil, fibre, etc. The tunicate extract is preferably prepared as described herein, for example by one or more steps of drying, ash reduction, cellulose reduction, protein enrichment and lipid enrichment carried out on the tunicate. In a preferred embodiment, the process comprises one or more steps of drying, ash reduction, cellulose reduction, heavy-metal reduction and toxin reduction to provide a protein-enhanced and/or lipid-enhanced material. In another preferred embodiment, the process comprises one or more steps of protein purification and/or lipid purification. An especially preferred process comprises the steps of obtaining a protein-enriched fraction (e.g. a fraction consisting essentially of protein) and/or a lipid-enriched fraction (e.g. a fraction consisting essentially of lipid) and optionally admixing the two said fractions in an appropriate ratio to provide a feed or feed component as defined herein.

The tunicate is as defined herein, preferably an ascidian of the sub-order enterogona, e.g. of the genus *Ciona*, especially *Ciona intestinalis*.

In the process of the invention, the tunicate is preferably grown on a sub-surface structure comprising a plurality of vertical members, each member having a plurality of substantially horizontal colonisation surfaces (e.g. plates) along its length, e.g. a structure as described herein. Preferably, said sub-surface structure comprises at least 5 horizontal colonisation surfaces per vertical member, especially at least 10 horizontal colonisation surfaces. Preferably, said sub-surface structure comprises at least 10 vertical members, especially at least 50, 100, 500 or 1000 vertical members.

In a preferred process for preparing a feed or feed component, the tunicate is grown as defined above and harvested from the sub-surface structure before being processed into the feed or feed component. The tunicate may be processed immediately after harvesting or may be pre-processed (e.g. dried and/or frozen) for storage before processing. Typically, at least 0.5 tonnes (500 kg) of tunicate (dry weight) is harvested and processed in one batch, especially at least 1, 10, 100 or 500 tonnes of tunicate. The process of the invention preferably provides at least 10 kg of feed component or at least 50 kg of feed in one batch, especially at least 50, 100, 500 or 1000 kg of feed component or at least 100, 200, 1000 or 2000 kg of feed.

In a related aspect, the invention provides a feed or feed component comprising tunicate or tunicate extract obtainable (e.g. obtained) by a process as described herein. In one embodiment the feed or feed component will be provided in an amount of at least 10 kg, e.g. at least 20 kg or at least 50 kg.

The invention will now be described in more detail in the following non-limiting Examples and with reference to the accompanying Figures in which:

FIG. 3 shows a GC analysis of a lipid fraction extract of tunicate (FIG. 3A) and a GC analysis of a fish oil (FIG. 3B).

EXAMPLE 1

Large-Scale Farming of Tunicates

Growth

Tunicates were grown on a sub-surface structure off the coast of Bergen, Norway, following natural seeding of vertical members carrying horizontal or vertical colonisation plates of an uninterrupted structure as described above. The structures were placed on longline systems with buoys and weights to keep the members vertical in the water column. Structures of this sort may be deployed in temperate to sub-temperate productive coastal areas. In this example, 15 m long vertical members comprising colonisation plates were deployed in Norway at Kvitsøy, Rogaland County (at a depth of 2-17 m); Huglo/Stord, Hordaland County (at a depth of 5-20 m); and at Rong/Øygarden, Hordaland County (at a depth of 4-19 m). The structures were deployed in May and left for 6 months before harvesting to allow the tunicates to colonise, develop and grow on the structures.

Harvesting

Figure 1:
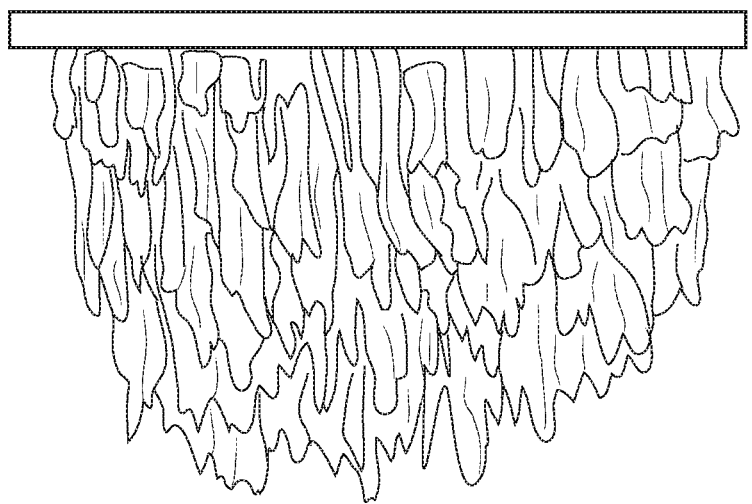
FIG. 1 shows a colonisation plate from a tunicate farm structure with tunicates attached to the lower surface.

Visual inspection of the colonisation surfaces after removal from the water indicated that the tunicates attached to the structure were predominantly *C. intestinalis, Ascidia* sp. and/or *Clavellina* sp. FIG. 1 shows an example of a colonisation plate with tunicates attached to the lower surface. A 20 kg sample of this tunicate material was removed by scraping and subsequently processed. Material for small scale processing was harvested by using divers and/or a crane or performed manually from a boat. Subsurface harvesting was done to avoid losing material and reduce energy consumption.

EXAMPLE 2

Processing of Tunicate Material

The tunicate material was processed in a number of ways as indicated below.

Drying 20 kg (wet weight) of Ascidian material was subjected to two consecutive rounds of a screwpress, heated to 80° C., and then put through a hydraulic laboratory press (HAFICO HP 2) in order to remove the water from the ascidians. The pressure from the hydraulic press was applied to the material in discrete steps of 2 min at increasing pressure. Initial pressure was 20 bar, then 50 bar and subsequent steps of 50 up to 450 bar. Reduction in water content was recorded throughout the experiment and values are shown below:

| Stages | Mass (kg) | % of total |
|---|---|---|
| Initial material | 20.6 | 100 |
| Material after screwpress 1 | 3.88 | 18.8 |
| Material after screwpress 2 | 2.56 | 12.4 |
| Liquid from steps 1 and 2 | 16.36 | 79.4 |
| Loss of material after steps 1 and 2 | 1.68 | 8.2 |
| Material after 450 bar press | 0.77 | 3.7 |
| Water reduction from pressing | | 96.3 |

Dryness of the final material after pressing was measured as 36.2% (IR-measured) having significant protein yields. Additional drying using a fluid-bed dryer yielded an overall dryness of 91.2%. Final ash-content after fluid-bed drying was 19% with a protein content of 30%. Sugar and lipid content was estimated at 13.82% and 5.03%, respectively.

Protein Extraction

The outer layer of tunicate was separated manually from the internal organs, followed by thorough rinsing with fresh water. The internal organs after freeze drying contained mainly protein (52%) with a small amount of cellulose (8%). The ash content was low (2-8%).

Lipid Extraction

The whole tunicate body was freeze-dried. The dried tunicate was subjected to extraction in Soxhlet equipment using petroleum ether (30-60° C.) for 6 hours. The resultant product was filtered to separate the solution (filtrate) from the solid tunicate material. The filtrate was evaporated under vacuum using a rotary evaporator. Lipid extract was obtained (3 wt % yield based on weight of dried tunicate).

Ash Reduction

The dried tunicates were re-suspended in fresh water followed by filtration or centrifugation. The process was repeated three times.

Preparation of a Protein-Rich Extract and a Lipid-Rich Extract

Tunicates are suspended in water and boiled for half an hour. The resulting mixture provides a lipid fraction layer floating on the surface (salt may be added if the layers are not clearly separated). The lipid fraction is removed from the surface of the mixture and the insoluble fraction is recovered from the rest of the mixture. After separation, the insoluble part is used as a protein extract and the oily top layer as a lipid extract.

EXAMPLE 3

Compositional Analysis of Tunicate Material

The dried sample obtained in Example 2 was analysed for:
(i) ash content (inorganic compounds). This was measured by burning and with the use of FTIR (Fourier transform infra-red) spectroscopy;
(ii) lignin content (i.e. content of lignin-like substances). This was determined by both kappa number (by the method set out in Li et al., "Kinetics and mechanism of kappa number determination" *Nordic Pulp Pap. Res.* 1 (1998), 13(2):147-152) and Klason lignin determination (by the method of the Tappi standard, T 222 om-02); and
(iii) lipid content and fatty acid composition. This was determined by the standard method described in Association of Official Analytical Chemists (AOAC) (method 983.23) and the European Pharmacopoeia ("2.4.22. Composition of fatty acids by gas chromatography").

The results were:
(i) Ash: 47 wt %, mainly sea salt (largely NaCl), i.e. 53 wt % of the sample is composed of organic compounds;

(ii) Lignin-like substances (e.g. aromatic amino acids and silicates from the benthic substrate attached to the foot of the animal): 6.3 wt (kappa number) and 7.2 wt % (Klason lignin); and (iii) Lipid content: 1.7 to 3.2 wt %. Fatty acid composition of the samples is shown in FIGS. 2 and 3 (see Example 4 below).

Additional compositional analysis was carried out on the tunicate material, see Table 1. The "Total" column shows the calculated proportion of components in the material; the "Ash-free" column shows the hypothetical proportions of components for the material from which all of the ash has been removed.

TABLE 1

Content, in % of dry matter

|  | Total (%) | Ash-free (%) |
|---|---|---|
| Ash | 47.0 | 0.0 |
| Cellulose | 6.7 | 12.7 |
| $C_6$ sugars | 8.8 | 16.7 |
| $C_5$ sugars | 0.4 | 0.8 |
| Lipids | 3.2 | 6.1 |
| Proteins | 26.7 | 50.1 |
| Other | 7.2 | 13.6 |

EXAMPLE 4

Lipid Analysis of a Tunicate Extract

Lipids from the tunicate material were isolated as described in Example 2 and 3 above. These lipids were then analysed by NMR and gas chromatography to determine the lipid profile of the material.

NMR Analysis

The lipid extract was analysed by $^1$H-NMR after dissolving the lipid in chloroform-d, recording on a Bruker Avance 400 MHz instrument using the $^1$H NMR standard Bruker pulse programs.

Figure 2A:
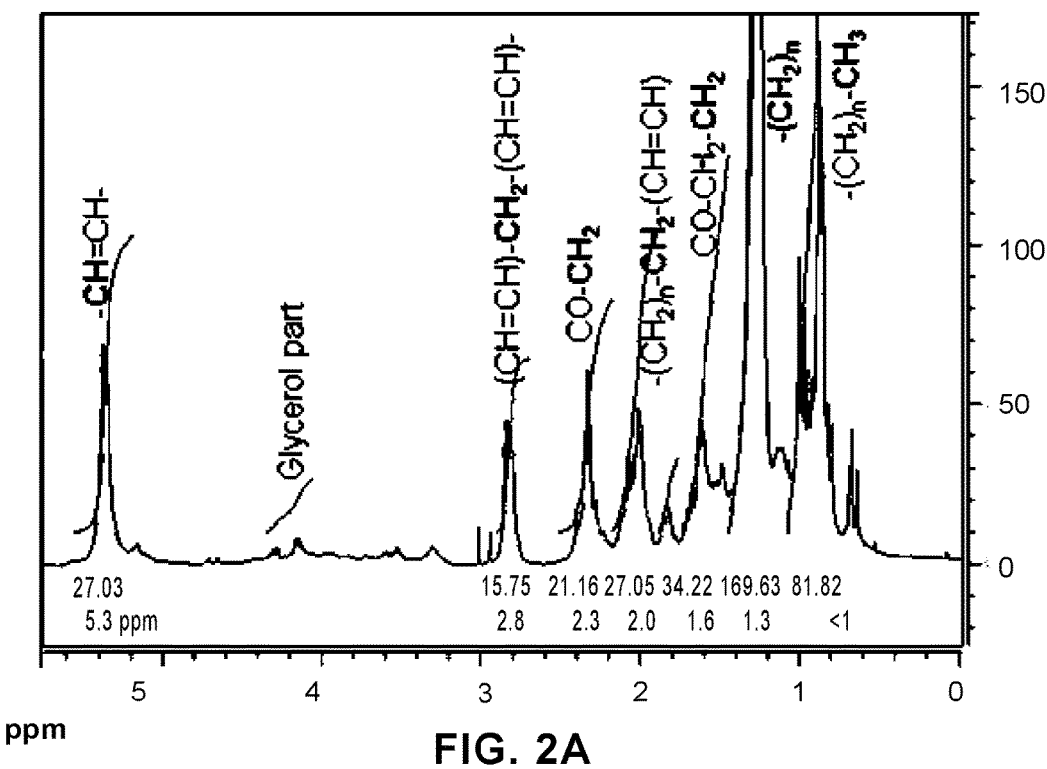
FIG. 2 shows $^1$H-NMR analysis of a lipid fraction extract of tunicate (FIG. 2A) and $^1$H-NMR analysis of a flaxseed oil (FIG. 2B).
Figure 2B:
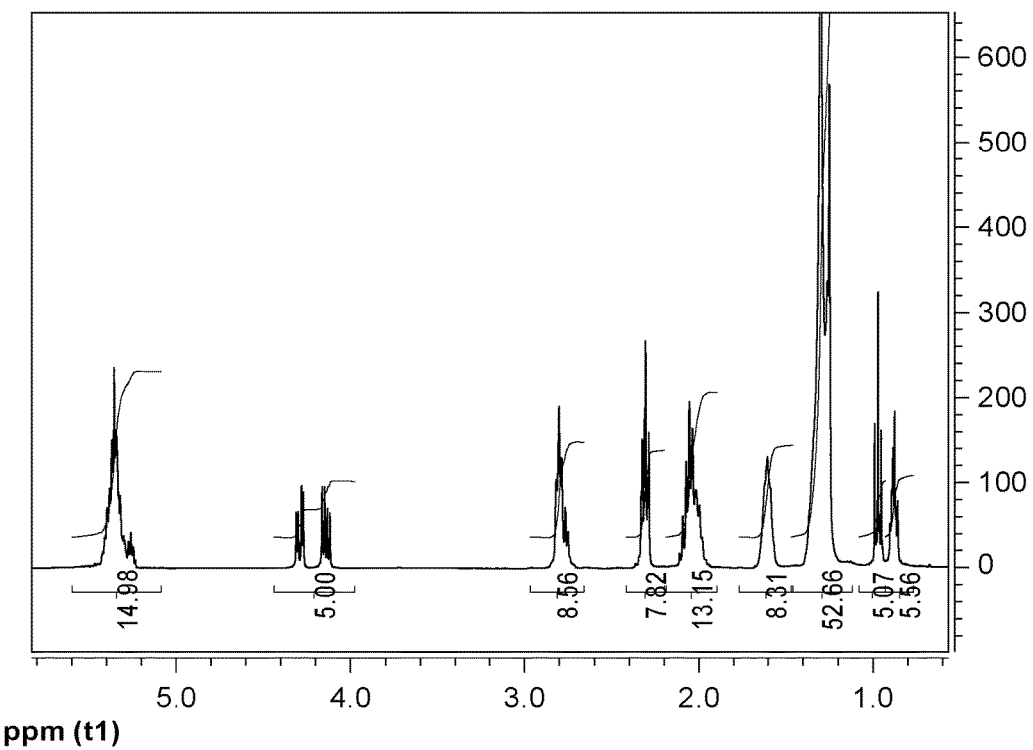

FIG. 2 shows the NMR profile of the lipid extract (FIG. 2A) and of the highly purified plant oil, flaxseed oil (FIG. 2B). The peaks around 4 ppm result from glycerol in the sample and the peaks around 2.5-3 ppm result from protons adjacent to multiple double bonds, i.e. they indicate the presence of highly unsaturated lipids.

GC Analysis

The lipid extract was analysed for fatty acid composition according to European Pharmacopoeia "2.4.22. Composition of fatty acids by gas chromatography".

FIG. 3A shows the gas chromatogram of the lipid extract, annotated to indicate the various fatty acids in the sample. FIG. 3B shows a corresponding gas chromatogram from a high-quality refined combined fish oil (Sigma-Aldrich). Table 2 and Table 3 below show the relative amounts of the different fatty acids in each sample as determined by the peak areas on the chromatogram:

TABLE 2

Fatty acid composition and contents of tunicate lipid

| Fatty acid | Content (%) |
|---|---|
| 16:0 | 11.1 |
| 16:1 | 2.2 |
| 16:2 | 3.0 |

TABLE 2-continued

Fatty acid composition and contents of tunicate lipid

| Fatty acid | Content (%) |
|---|---|
| 18:0 | 5.9 |
| 18:1 | 3.4 |
| 18:2 | 5.5 |
| 18:3 | 2.4 |
| 18:4 | 4.7 |
| 20:0 | 0.6 |
| 20:1 | 3.0 |
| 20:2 | 0.7 |
| 20:3 | 0.2 |
| EPA | 24.2 |
| DHA | 3.0 |

TABLE 3

Characterization of fatty acids in tunicate lipid

| Fatty acid | Content (%) |
|---|---|
| Saturated fatty acid (SFA) | 17.6 |
| Unsaturated | 52.3 |
| Monounsaturated fatty acid (MUFA) | 8.6 |
| Polyunsaturated fatty acid (PUFA) | 43.7 |
| ω-3 fatty acids | 29.6 |
| ω-6 fatty acids | 5.5 |
| ω-3/ω-6 ratio | 5.4:1 |
| EPA/DHA ratio | 8:1 |

The data shown in FIG. 3 and Tables 2 and 3 demonstrate that the tunicate lipid fraction is a high-quality nutritional additive with a similar fatty acid profile to that of fish oil. This indicates that the tunicate lipid extract is a suitable replacement for animal oils, e.g. fish oils, in animal feeds such as fish feeds.

EXAMPLE 5

Protein Extract of Tunicate Material

Proteins-containing extracts were obtained from tunicates harvested in Example 1 by fractionation, washing and drying as described in Example 2. To characterise the amino-acid composition, samples of the whole animal, the inner organs and the outer part (mantle) of the animal were analysed according to the Chinese national standard GB/T 5009.124-2003, in which 10-20 mg of a mashed dried sample was accurately weighed and added to 10 mL of 6M HCl with 3 drops of phenol. After freezing the resulting suspensions for 3-5 minutes and replacing all of the air with nitrogen, the sample suspensions were heated at 110° C. for 22 hours, followed by filtration, and analysed using an amino acid analyser (Hitachi L-8800 high speed amino acid analyzer) and external amino acid standards.

TABLE 4

Characterization of components (amino acids) from different parts of the tunicate, results being shown as weight percent of dried material

| Component | Inner organs | Mantle | Whole animal |
|---|---|---|---|
| Asp# | 5.76 | 3.22 | 4.18 |
| Thr* | 2.66 | 1.83 | 2.17 |
| Ser | 3.00 | 1.69 | 2.18 |
| Glu# | 8.52 | 3.20 | 5.27 |
| Gly# | 3.81 | 1.52 | 2.31 |
| Ala# | 2.57 | 1.33 | 1.81 |

TABLE 4-continued

Characterization of components (amino acids) from different parts of the tunicate, results being shown as weight percent of dried material

| Component | Inner organs | Mantle | Whole animal |
|---|---|---|---|
| Cys | 1.70 | 1.93 | 1.93 |
| Val* | 2.08 | 1.35 | 1.70 |
| Met* | 1.09 | 0.38 | 0.54 |
| Ile* | 1.72 | 0.95 | 1.28 |
| Leu* | 3.79 | 1.75 | 2.54 |
| Tyr | 1.98 | 1.36 | 1.56 |
| Phe* | 1.73 | 0.81 | 1.13 |
| Lys* | 3.41 | 0.90 | 1.84 |
| $NH_3$ | 0.76 | 0.55 | 0.64 |
| His | 1.17 | 0.67 | 0.90 |
| Arg | 3.63 | 1.24 | 2.13 |
| Pro | 2.47 | 1.36 | 1.77 |
| Total (%) | 51.85 | 26.04 | 35.88 | delicious amino acid;
*essential amino acid

The proportions of different sorts of amino acids were then calculated, based on the data in Table 4.

TABLE 5

Characterization and calculation of amino acids from different tunicate samples

| | Inner organs | Mantle | Whole animal |
|---|---|---|---|
| Delicious amino acid (DAA) (%) | 20.66 | 9.27 | 13.57 |
| Essential amino acid (EAA) (%) | 16.48 | 7.97 | 11.20 |
| EAA/TAA (%) | 31.78 | 30.61 | 31.22 |
| DAA/TAA (%) | 39.85 | 35.60 | 37.82 |
| Semi essential amino acid (His + Arg) (%) | 4.80 | 1.91 | 3.03 |
| Nonessential amino acid (NEAA) (%) | 29.81 | 15.61 | 21.01 |
| EAA/NEAA | 0.55 | 0.51 | 0.53 |
| Essential amino acid index (EAAI) | 53.60 | 58.33 | 56.88 |

It can be seen from Table 4 that the whole tunicate contains around 36% amino acids (TAA). The inner organs consist of around 52% while the outer tunic is poor in amino acids (26%). The results in Table 5 show that all parts of tunicate are good quality protein sources, having EAA/TAA values of >30% and EAA/NEAA values of >0.50. Furthermore, all parts of the tunicate have a similar and high nutrition value, with the EAAI values being between 53 and 60, similar to the values found in some fishes used as high-quality feed additives. In addition, there are high levels of the four amino acids responsible for delicious tastes (glutamic acid, aspartic acid, glycine and alanine). The total amount of these four amino acids in the different tunicate samples is higher than 35% of the total.

EXAMPLE 6

Fish Feed

A blend of 30% fish meal, 10% soyameal, 10% wheat gluten, 15% tunicate meal, 25% fish oil, 5% plant oil, 4% starch and 1% by weight of vitamin/mineral mix is mixed and forced through an extruder in order to form pellets of a suitable size.

The feed is based on a proven feed for salmon with the tunicate meal substituting some of the fishmeal normally used in salmon feed.

The invention claimed is:

1. A method of feeding a fish comprising administering to said fish a feed, wherein the feed comprises an inner part of a tunicate which is *Ciona intestinalis* or a nutrition-providing extract thereof.

2. The method of claim 1, wherein the feed comprises at least 5% by weight of tunicate protein.

3. The method of claim 1, wherein the feed comprises at least 5% by weight of tunicate lipids.

4. The method of claim 1, wherein the tunicate extract comprises at least 40% by weight of tunicate protein and/or at least 1% by weight of tunicate lipid on an ash-free basis.

5. The method of claim 1, wherein the feed comprises:
   0-50% by weight fishmeal,
   0-40% by weight fish oil,
   0-20% by weight soyaprotein meal,
   0-20% by weight wheat gluten,
   1-80% by weight of said inner part of said tunicate or extract thereof, and
   0-10% by weight plant oil.

6. The method of claim 1, wherein the feed comprises an extract of said inner part of said tunicate.

7. The method of claim 1, wherein the tunicate extract is a partially or fully dried, ash-reduced, polysaccharide-reduced, heavy metal-reduced, and/or toxin-reduced extract.

8. The method of claim 1, wherein the tunicate extract has a dryness content of at least 70%.

9. The method of claim 6, wherein the tunicate extract is a protein-enhanced and/or lipid-enhanced extract.

10. The method of claim 9, wherein the tunicate extract comprises at least 50% by weight of tunicate protein.

11. The method of claim 9, wherein the tunicate extract comprises at least 30% by weight of tunicate lipid.

12. The method of claim 2, wherein the feed comprises at least 10% by weight of tunicate protein.

13. The method of claim 3, wherein the feed comprises at least 15% by weight of tunicate lipids.

14. The method of claim 6, wherein the feed consists essentially of an extract of said inner part of said tunicate.

15. The method of claim 7, wherein the tunicate extract is a cellulose-reduced extract.

16. The method of claim 7, wherein the tunicate extract is a dried and ash-reduced extract.

17. The method of claim 10, wherein the tunicate extract comprises at least 90% by weight of tunicate protein.

18. The method of claim 11, wherein the tunicate extract comprises at least 70% by weight of tunicate lipid.

* * * * *